(12) United States Patent
Clarke et al.

(10) Patent No.: US 8,239,345 B2
(45) Date of Patent: Aug. 7, 2012

(54) ASYNCHRONOUS REPLICATION

(75) Inventors: Simon P. Clarke, Seattle, WA (US); Miko Arnab Sakhya Singha Bose, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 11/965,144

(22) Filed: Dec. 27, 2007

(65) Prior Publication Data

US 2009/0172041 A1    Jul. 2, 2009

(51) Int. Cl.
*G06F 7/00* (2006.01)
*G06F 17/00* (2006.01)

(52) U.S. Cl. ......................................... 707/613

(58) Field of Classification Search ................... 707/610, 707/613, 638, 704, 694
See application file for complete search history.

(56) References Cited

U.S. PATENT DOCUMENTS

| | | | | |
|---|---|---|---|---|
| 5,684,984 A * | 11/1997 | Jones et al. | ............................ | 1/1 |
| 5,806,075 A * | 9/1998 | Jain et al. | ................................ | 1/1 |
| 6,167,438 A | 12/2000 | Yates et al. | ..................... | 709/216 |
| 6,182,121 B1 | 1/2001 | Wlaschin | ...................... | 709/215 |
| 6,393,437 B1 * | 5/2002 | Zinda et al. | ........................... | 1/1 |
| 6,701,316 B1 * | 3/2004 | Li et al. | .................................... | 1/1 |
| 6,772,309 B1 * | 8/2004 | Ohr et al. | ...................... | 711/163 |
| 7,024,451 B2 | 4/2006 | Jorgenson | ..................... | 709/203 |
| 7,103,794 B2 | 9/2006 | Malcolm et al. | .................. | 714/4 |
| 7,191,290 B1 | 3/2007 | Ackaouy et al. | ............. | 711/119 |
| 7,203,708 B2 * | 4/2007 | Liu et al. | ................................ | 1/1 |
| 7,743,039 B2 * | 6/2010 | Jones et al. | .................... | 707/704 |
| 2003/0140209 A1 | 7/2003 | Testardi | ........................ | 711/203 |
| 2004/0083489 A1 | 4/2004 | Bansal et al. | .................... | 725/44 |
| 2005/0204106 A1 | 9/2005 | Testardi | ......................... | 711/162 |
| 2006/0026154 A1 | 2/2006 | Altinel et al. | ...................... | 707/5 |
| 2007/0174660 A1 | 7/2007 | Peddada | ............................ | 714/4 |

OTHER PUBLICATIONS

Maria A. Butrico et al., "Gold Rush: Mobile Transaction Middleware with Java-Object Replication," Proceedings of the Third USENIX Conference on Object-Oriented Technologies and Systems, Jun. 1997, 13 pgs., http://www.usenix.com/publications/library/proceedings/coots97/full_papers/butrico/butrico.pdf.

Hongfei Guo et al., "Relaxed Currency and Consistency: How to Say "Good Enough" in SQL," SIGMOND 2004, Jun. 13-18, 2004, pp. 1-12, http://pages.cs.wisc.edu/~guo/publications/RelaxedCC2004.pdf.

Bela Ban et al., "TeeCache: a Tree Structured Replicated Transactional Cache," pp. 1-35, http://labs.jboss.com/file-access/default/members/jbosscache/freezone/docs/1.2.4.SP2/TreeCache/en/pdf/TreeCache.pdf.

* cited by examiner

*Primary Examiner* — Greta Robinson
*Assistant Examiner* — Jeffrey Chang
(74) *Attorney, Agent, or Firm* — Merchant & Gould

(57) ABSTRACT

Contents of a copy of a server file may be saved to a down load file, a base file, and a working file. An indication may be received from an application that the application has edited the working file and a copy of the edited working file may be saved to an upload file. A server computer may be queried to determine if the server file on the server computer has been changed. If the server file on the server computer has not been changed, the server file on the server computer may be updated with contents of the upload file. If the server file on the server computer has been changed, a three-way merge of the upload file, the base file, and the changed server file on the server computer may be performed. Then the server file on the server computer may be updated with the three-way merge results.

20 Claims, 3 Drawing Sheets

ASYNCHRONOUS REPLICATION

BACKGROUND

Client-server is a computing architecture that separates a client from a server over a computer network. Each client or server connected to the computer network can be referred to as a node. The most basic client-server architecture type employs only two node types: clients and servers. This architecture type is sometimes referred to as "two-tier." The two-tier architecture allows clients and servers to share files and resources over the computer network.

Clients may run many software instances. Each client software instance can send data file requests to one or more connected servers. In turn, the servers can accept these requests, process them, and return the requested data file to the requesting client. So that no other client may edit the data file, a "lock" may be placed on the requested data file on the server. However, when a connection over the computer network between the client and the server is lost, the lock may also be lost. This may be problematic because when the connection is regained, without the lock in place, the client has no way to know if the data file was edited by another client after the connection (and consequently the lock) was lost.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Contents of a copy of a server file may be saved to a down load file, a base file, and a working file. These files (e.g. down load, base, and working) may be stored on a client machine in an abstracted manner (e.g. in a database) to allow more efficient storage and update. These files may not necessary be actual files. An indication may be received from an application that the application has edited the working file and a copy of the edited working file may be saved to an upload file. A server computer may be queried to determine if the server file on the server computer has been changed. If the server file on the server computer has not been changed, the server file on the server computer may be updated with contents of the upload file. Because no locks may be present to guarantee atomicity, the server computer may perform this check and replace in one atomic transaction. If the server file on the server computer has been changed, a three-way merge of the upload file, the base file, and the changed server file on the server computer may be performed. Then the server file on the server computer may be updated with the three-way merge results.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
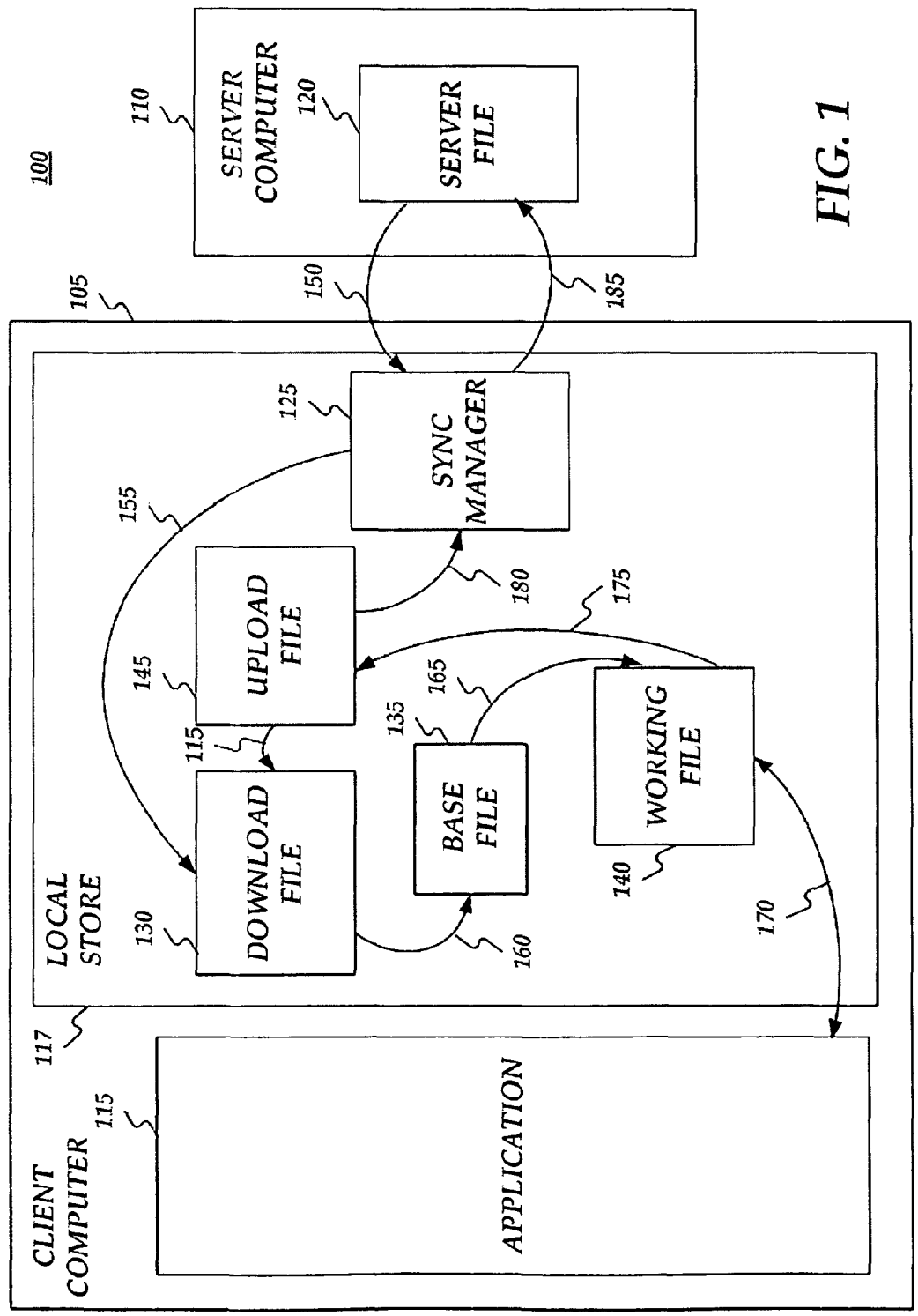
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Asynchronous replication may be provided (e.g. with respect to a user interface.) Embodiments of the present invention may provide reliable availability for a user's server based files. For example, embodiments of the present invention may cache remote content (e.g. from a server) automatically in a local store (e.g. on a client). This cache may be owned and managed by a local application on the client. To provide this remote cache feature, embodiments of the present invention may: i) seamlessly replicate server files to the local store on the client operated by the user; ii) operate on the files at the local store; and iii) merge the files back up to the server as needed from the local store. This feature may make opening and saving server based files more resilient to failures because maintaining a lock on server files may not be required as described in greater detail below.

FIG. 1 is a block diagram of an operating environment 100. As shown in FIG. 1, operating environment 100 may include a client computer 105 and a server computer 110 connected via a network (not shown). Server computer 110 may be a remote file server configured to serve, for example, a server file 120. Client computer 105 may include an application 115 and a local store 117. Application 115 may comprise, but is not limited to, an electronic mail and contacts applications, a word processing application, a spreadsheet application, a database application, a slide presentation application, or a drawing or computer-aided application program. Local store 117 may comprise a sync manager 125, a down load file 130, a base file 135, a working file 140, and an upload file 145. Sync manager 125 may comprise a software module that may operate local store 117 as described in more detail below with respect to FIG. 2.

Figure 2:
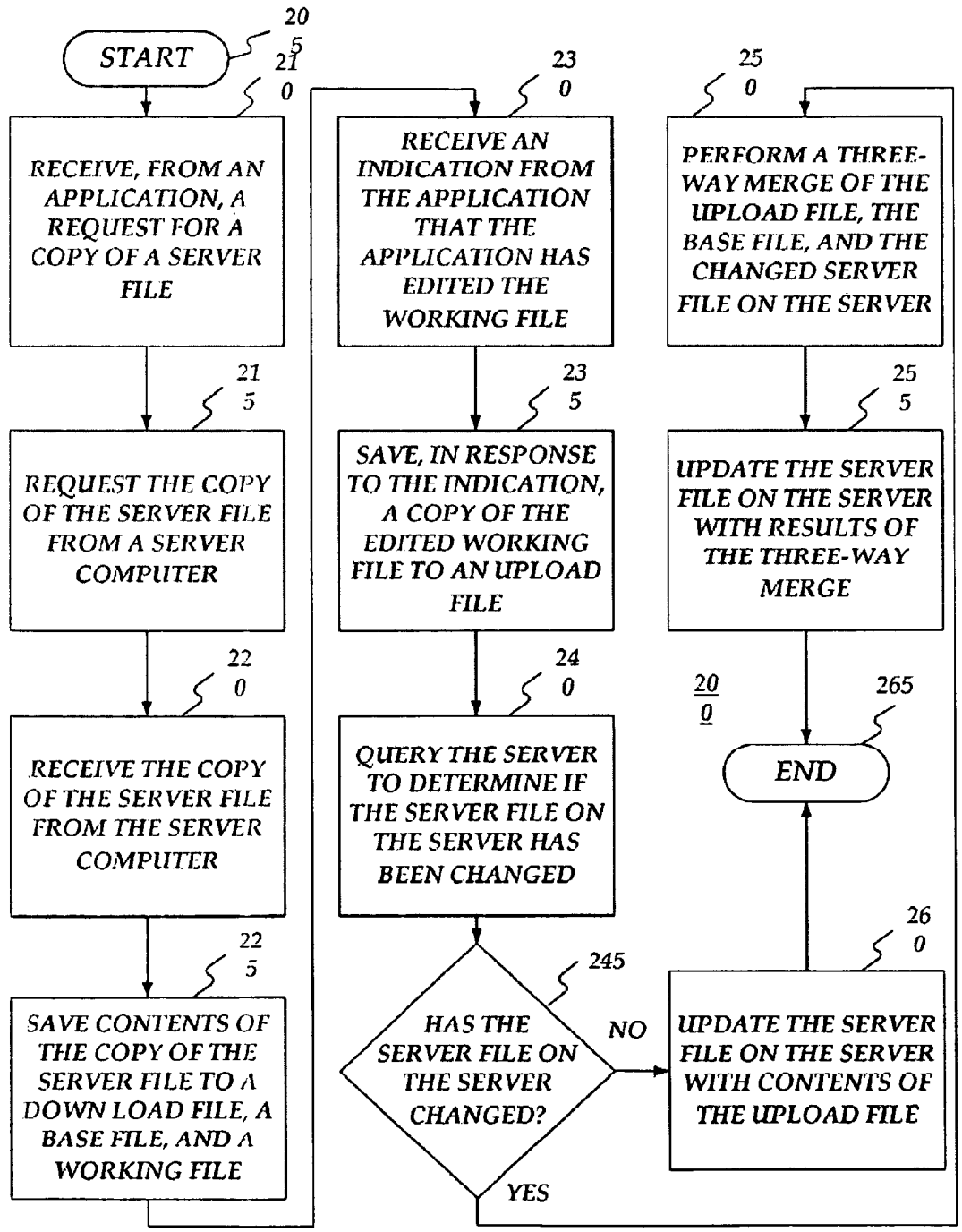
FIG. 2 is a flow chart of a method for providing asynchronous replication.

FIG. 2 is a flow chart setting forth the general stages involved in a method 200 consistent with an embodiment of the invention for providing asynchronous replication. Method 200 may be implemented using client computer 105 as described in more detail below with respect to FIG. 3. Ways to implement the stages of method 200 will be described in greater detail below. Method 200 may begin at starting block 205 and proceed to stage 210 where sync manager 125 may receive, from application 115, a request for a copy of server file 120. For example, application 115 may comprise, but is not limited to, a word processing application. For example, a user operating application 115 may wish to open a document that resides on server computer 110. Accordingly, application 115 may indicate to sync manager 125 that application 115 needs to open server file 120 on server computer 110.

From stage 210, where sync manager 125 receives the request for the copy of server file 120, method 200 may advance to stage 215 where sync manager 125 may request the copy of server file 120 from server computer 110. For example, sync manager 125 may communicate with server computer 110 over the network that connects client computer 105 to server computer 110 to request the copy of server file 120 from server computer 110.

Once sync manager 125 requests the copy of server file 120 from server computer 110 in stage 215, method 200 may continue to stage 220 where sync manager 125 may receive the copy of server file 120 from server computer 110. For example, sync manager 125 may receive the copy of server file 120 over the network from server computer 110. (State 150.) Consistent with embodiments of the invention, server file 120 may stay in tact on server computer 110 and sync manager my only receive the copy of server file 120. When the copy of server file 120 is received by sync manager 125, a lock may or may not be placed on server file 120 residing on server computer 110. Consistent with embodiments of the invention, a lock on server file 120 residing on server computer 110 may be optional. Whether or not to take a lock may be dependent on user scenario and features (e.g. whether multi-user editing is desirable.)

After sync manager 125 receives the copy of server file 120 from server computer 110 in stage 220, method 200 may proceed to stage 225 where sync manager 125 may save contents of the copy of server file 120 to down load file 130, base file 135, and working file 140. For example, sync manager 125 may replicate the copy of server file 120 to local store 117 on client computer 105. In other words, the copy of server file 120 may be replicated to download file 130 (state 155), may be replicated to base file 135 (state 160), and may also be replicated to working file 140 (state 165).

From stage 225, where sync manager 125 saves the contents of the copy of server file 120 to down load file 130, base file 135, and working file 140, method 200 may advance to stage 230 where sync manager 125 may receive an indication from application 115 that application 115 has edited working file 140. For example, as stated above, application 115 may be a word processing application. The user operating application 115 may wish to open a document (e.g. server file 120) from server computer 110. As described above, a copy of server file 120 may be copied to working file 140. Working file 140 may be the copy that the user edits or otherwise directs application 115 to operate upon. For example, the user may make changes to the document. These changes may be saved to working file 140 by application 115. (State 170.) Upon saving edits to working file 140, application 115 may send to sync manager 125 the indication that application 115 has edited working file 140. Furthermore, upon closing application 115, application 115 may send the indication to sync manager 125.

Once sync manager 125 receives the indication from application 115 in stage 230, method 200 may continue to stage 235 where sync manager 125 may save, in response to the indication, a copy of edited working file 140 to upload file 145. For example, upon receiving the indication that application 115 has made changes to working file 140 or upon application 115 closing, sync manager 125 may save a copy of edited working file 140 to upload file 145. (State 175.)

After sync manager 125 saves the copy of edited working file 140 to upload file 145 in stage 235, method 200 may proceed to stage 240 where sync manager 125 may query server computer 110 to determine if server file 120 on server computer 110 has been changed. In other words, at decision block 245, sync manager 125 may determine if server file 120 on server computer 110 has been changed. For example, if no lock was placed on server file 120 by server computer 110 when the copy of server file 120 was received by sync manager 125, another client may have made changes to server file 120 after the copy of server file was replicated to local store 117.

Furthermore, if a lock was placed on server file 120 by server computer 110 when the copy of server file 120 was received by sync manager 125, but the lock was later lost, another client may have made changes to server file 120 after the copy of server file 120 was replicated to local store 117. The lock may have been lost, for example, if the connection between server computer 110 and client computer 105 is lost. In this case with a lost lock due to a lost connection, upon regaining the connection between server computer 110 and client computer 105, another client may have made changes to server file 120 after the copy of server file 120 was replicated to local store 117 and after the lock was lost.

Moreover, the user may work with application 115 offline from server computer 110 after the copy of server file 120 was replicated to local store 117. Upon reconnecting to server computer 110 after working offline, sync manager 125 may query server computer 110 to determine if server file 120 on server computer 110 has been changed since the copy of server file 120 was replicated to local store 117 before working offline. In other words, anytime client computer 105 reconnects to server computer 110, sync manager 125 may query server computer 110 to determine if server file 120 on server computer 110 has been changed since the copy of server file 120 was replicated to local store 117.

In addition, sync manager 125 may query server computer 110 to determine if server file 120 on server computer 110 has been changed since the copy of server file 120 was replicated to local store 117: i) in response to a user command to do so; ii) periodically based on a predetermined schedule; or iii) based upon the bandwidth of the connection between the client computer and the server computer reaching a certain predetermined level or falling within a predetermined range. While the aforementioned may be for a 'polling' based approach, if server computer 110 supports change notifications, these could be used to make the process more efficient.

In making the determination as to whether server file 120 on server computer 110 has been changed since the copy of server file 120 was replicated to local store 117, sync manager 125 may assume that server file 120 on server computer 110 has been changed: i) if no lock is taken on server file 120; ii) anytime a lock is lost on server file 120; iii) anytime a connection is lost between client computer 115 and server computer 110; or iv) anytime client computer 115 is connected or reconnected to server computer 110. Furthermore in determining if server file 120 on server computer 110 has been changed since the copy of server file 120 was replicated to local store 117, base file 135 may have a time stamp as to when it was saved to local store 117. Furthermore, server file 120 on server computer 110 may have a time stamp as to the last time it was changed. If sync manager 125 determines base file 135's time stamp post dates server file 120 on server computer 110's time stamp as to the last time it was changed, sync manager 125 may determine that server file 120 on server computer 110 has not been changed since the copy of server file 120 was replicated to local store 117. In some situations, time stamps may not be very robust (e.g. the time may be adjusted on the server.) In addition to the time stamp, a file version/revision ID, such as an ETAG, may be used.

From decision block 245, if sync manager 125 determined that server file 120 on server computer 110 has been changed, method 200 may proceed to stage 250 where sync manager 125 may perform a three-way merge of upload file 145, base file 135, and changed server file 120 on server computer 110. For example, base file 135 may represent a common reference point from which edited working file 140 and changed server file 120 on server 110 may have diverged. As described above with respect to stage 235, upload file 145 may comprise a copy of working file 140. Consequently, performing a three-way merger may show the edits made to working file 140 by application 115's user and any changes made by another user to server file 120 after the copy of server file 120 was replicated to local store 117. Accordingly, the three-way merge output may take into consideration the changes made by application 11 5's user and by the other user who changed server file 120 on server computer 110. Consistent with embodiments of the invention, the three-way merge may be performed by application 115. Application 115 my perform the three-way merge because application 115 may include functionality to perform a three-way merge on a file format specific to application 115. Notwithstanding, sync manager 125 may perform the three-way merge.

After sync manager 125 performs the three-way merge in stage 250, method 200 may proceed to stage 255 where sync manager 125 may update server file 120 on server computer 110 with results of the three-way merge. For example, because the three-way merge output may take into consideration the changes made by application 115's user and by the other user who changed server file 120 on server computer 110, updating server file 120 on server computer 110 with results of the three-way merge may cause server file 120 to be the most up-to-date without destroying any user's edits or changes. Furthermore, after sync manager 125 performs the three-way merge, sync manager 125 may also replace the contents of down load 130 file and contents of base file 135 with the results of the three-way merge.

From decision block 245, if sync manager 125 determined, however, that server file 120 on server computer 110 has not been changed, method 200 may proceed to stage 260 where sync manager 125 may update server file 120 on server computer 110 with contents of upload file 145. For example, because server file 120 on server computer 110 has not been changed, base file 135 and server file 120 on server computer 110 may be identical. Consequently, sync manager 125 may perform a diff between base file 135 and upload file 145 and send the results of the diff to server computer 110 over the network connection. Because upload file 145 may be large, sending all of upload file 145 over the connection may use considerable bandwidth on the connection. Also, because there may be considerable redundancy between base file 135 and upload file 145, the results of the diff may be very small. Because the diff results may be very small, sending the diff results over the connection may use little bandwidth on the connection compared to sending all of upload file 145.

Furthermore, consistent with embodiments of the invention, sync manager 125 may receive updates made by other users to server file 120 on server computer 110. Once these updates are received, sync manager may update working file 140 with these updates while the user is working on working file 140. For example, sync manager 125 may send a message to application 115 that updates are available. In response to user input from application 115's user, sync manager 125 may update working file 140 with the updates. Once sync manager 125 updates server file 120 on server computer 110 with the contents of upload file 145 in stage 260 or updates server file 120 on server computer 110 with the results of the three-way merge in stage 255, method 200 may then end at stage 265.

Embodiments consistent with the invention may comprise a system for providing asynchronous replication. The system may comprise a memory storage and a processing unit coupled to the memory storage. The processing unit may be operative to receive, from an application, a request for a copy of a server file and to request the copy of the server file from a server computer. In addition, the processing unit may be operative to receive the copy of the server file from the server computer and to save contents of the copy of the server file to a down load file, a base file, and a working file. Moreover, the processing unit may be operative to receive an indication from the application that the application has edited the working file and to save, in response to the indication, a copy of the edited working file to an upload file. Furthermore, the processing unit may be operative to query the server computer to determine if the server file on the server computer has been changed. When it is determined that the server file on the server computer has not been changed, the processing unit may be operative to update the server file on the server computer with contents of the upload file. However, when it is determined that the server file on the server computer has been changed, the processing unit may be operative to: i) perform a three-way merge of the upload file, the base file, and the changed server file on the server computer; ii) update the server file on the server computer with results of the three-way merge; and iii) replace the contents of the down load file and the base file with the results of the three-way merge.

Figure 3:
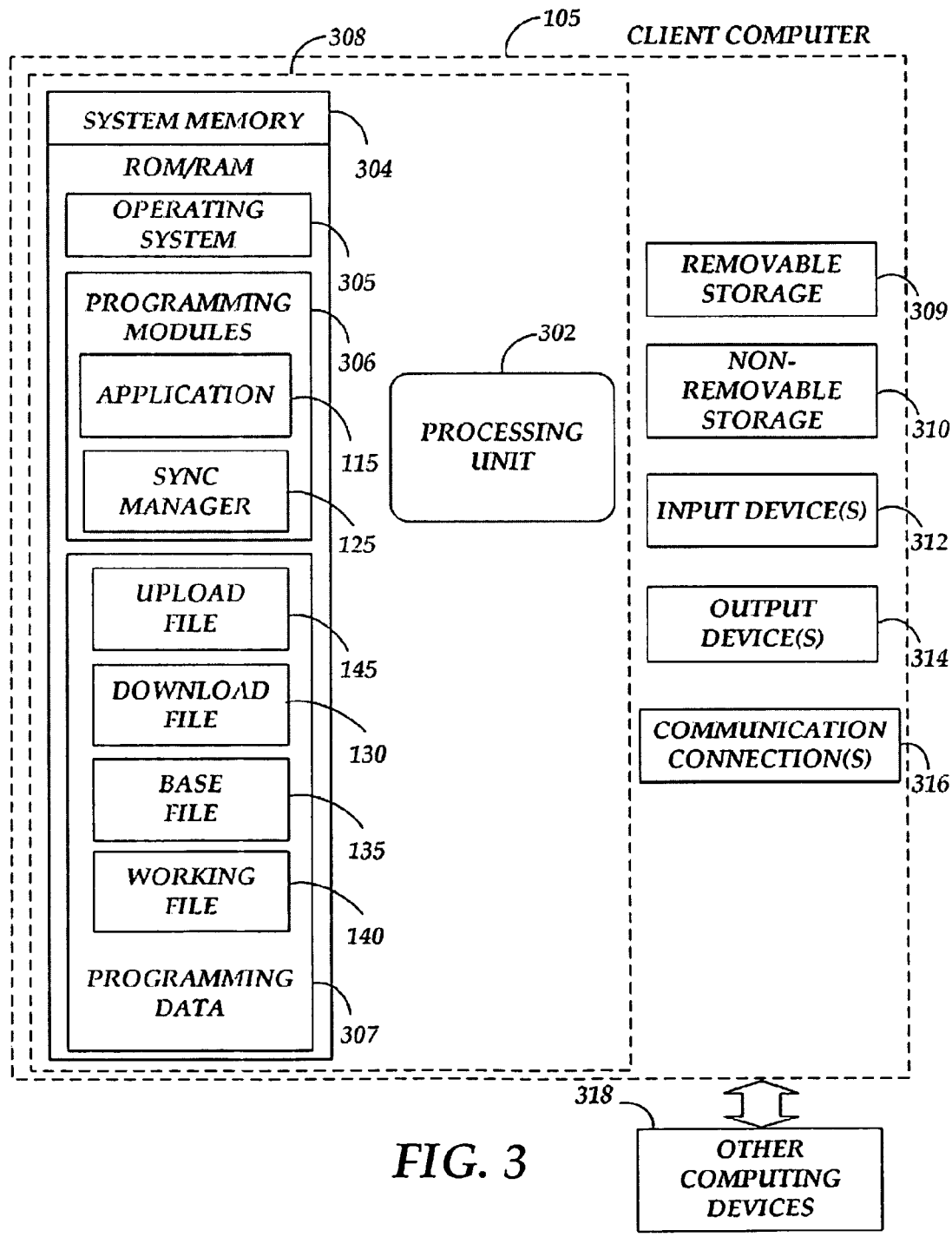
FIG. 3 is a block diagram of a system including a client computer.

FIG. 3 is a block diagram of a system including client computer 105. Consistent with an embodiment of the invention, the aforementioned memory storage and processing unit may be implemented in a computing device, such as client computer 105 of FIG. 3. Any suitable combination of hardware, software, or firmware may be used to implement the memory storage and processing unit. For example, the memory storage and processing unit may be implemented with client computer 105 or any of other computing devices 318 (e.g. server computer 110), in combination with client computer 105. The aforementioned system, device, and processors are examples and other systems, devices, and processors may comprise the aforementioned memory storage and processing unit, consistent with embodiments of the invention.

With reference to FIG. 3, a system consistent with an embodiment of the invention may include a computing device, such as client computer 105. In a basic configuration, client computer 105 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a program data 307. Programming data 307 may include down load file 130, base file 135, working file 140, and upload file 145. Operating system 305, for example, may be suitable for controlling client computer 105's operation. In one embodiment, programming modules 306 may include, for example application 115 and sync manager 125. Furthermore, embodiments of the invention may be practiced in conjunction with a graphics library, other operating systems, or any other application program and is not limited to any particular application or system. This basic configuration is illustrated in FIG. 3 by those components within a dashed line 308.

Client computer 105 may have additional features or functionality. For example, client computer 105 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by client computer 105. Any such computer storage media may be part of device 300. Client computer 105 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Client computer 105 may also contain a communication connection 316 that may allow device 300 to communicate with other computing devices 318 (e.g. server computer 110), such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. sync manager 125 or application 115) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing asynchronous replication, the method comprising:
    saving contents of a copy of a server file to a down load file, a base file, and a working file, wherein saving the contents of the copy of the server file comprises replicating the contents of the server file to each one of the following: the down load file, the base file, and the working file;
    receiving an indication from an application that the application has edited the working file;
    saving, in response to the indication, a copy of the edited working file to an upload file;
    querying a server computer to determine if the server file on the server computer has been changed;
    when it is determined that the server file on the server computer has not been changed, updating the server file on the server computer with contents of the upload file; and
    when it is determined that the server file on the server computer has been changed,
        performing a three-way merge of the upload file, the base file, and the changed server file on the server computer, and
        updating the server file on the server computer with results of the three-way merge.

2. The method of claim 1, further comprising receiving, from the application, a request for the copy of the server file.

3. The method of claim 1, further comprising requesting the copy of the server file from the server computer.

4. The method of claim 1, further comprising receiving the copy of the server file from the server computer.

5. The method of claim 1, further comprising replacing, when it is determined that the server file on the server computer has been changed, contents of the down load file and contents of the base file with the results of the three-way merge.

6. The method of claim 1, wherein receiving the indication from the application comprises receiving the indication from the application wherein the application, the down load file, the base file, the working file, and the upload file are on a client computer.

7. The method of claim 1, wherein saving the copy of the edited working file to the upload file comprises saving the copy of the edited working file to the upload file in response to a user initiated command to the application to save the working file.

8. The method of claim 1, wherein saving the copy of the edited working file to the upload file comprises saving the copy of the edited working file to the upload file in response to a user initiated command to the application to close the application.

9. The method of claim 1, wherein performing the three-way merge comprises the application performing the three-way merge.

10. The method of claim 1, wherein querying the server computer to determine if the server file on the server computer has been changed comprises querying the server computer in response to a client computer on which the application is running losing and regaining a connection with the server computer.

11. The method of claim 1, wherein querying the server computer to determine if the server file on the server computer has been changed comprises querying the server computer in response to a client computer, on which the application is running, being connected to the server computer.

12. The method of claim 1, wherein querying the server computer to determine if the server file on the server computer has been changed comprises querying the server computer in response to a client computer, on which the application is running, being connected to the server computer in response to a user command.

13. The method of claim 1, wherein querying the server computer to determine if the server file on the server computer has been changed comprises querying the server computer in response to a predetermined schedule.

14. The method of claim 1, wherein querying the server computer to determine if the server file on the server computer has been changed comprises querying the server computer in response to an available bandwidth of a connection between a client computer on which the application is running and the server computer is greater than a predetermined value.

15. The method of claim 1, further comprising:
    receiving updates to the server file from the server; and
    saving the received updates to the download file and to the working file.

16. The method of claim 1, wherein updating the server file on the server computer with contents of the upload file comprises:
    performing a diff between the base file and the upload file to determine a difference between the base file and the upload file; and
    transmitting the difference between the base file and the upload file to the server computer from a client computer on which the application is running and on which the base file and the upload file reside.

17. The method of claim 1, wherein updating the server file on the server computer with results of the three-way merge comprises:
    performing a diff between the results of the three-way merge and the server file to determine the difference between the results of the three-way merge and the server file; and
    transmitting the results of the three-way merge and the server file to the server computer from a client computer on which the application is running and on which the three-way merge was performed.

18. The method of claim 1, further comprising:
establishing a lock on the server file, and
wherein querying the server computer to determine if the server file on the server computer has changed comprises querying the server computer when a lock on the server file was lost due to a lost connection with the server.

19. A computer-readable storage medium device which stores a set of instructions which when executed performs a method for providing asynchronous replication, the method executed by the set of instructions comprising:
receiving, from an application, a request for a copy of a server file;
requesting the copy of the server file from a server computer;
receiving the copy of the server file from the server computer;
saving contents of the copy of the server file to a down load file, a base file, and a working file, wherein saving the contents of the copy of the server file comprises replicating the contents of the server file to each one of the following: the down load file, the base file, and the working file;
receiving an indication from the application that the application has edited the working file;
saving, in response to the indication, a copy of the edited working file to an upload file;
querying the server computer to determine if the server file on the server computer has been changed;
when it is determined that the server file on the server computer has not been changed, updating the server file on the server computer with contents of the upload file; and
when it is determined that the server file on the server computer has been changed,
performing a three-way merge of the upload file, the base file, and the changed server file on the server computer,
updating the server file on the server computer with results of the three-way merge, and
replacing the contents of the down load file and the base file with the results of the three-way merge.

20. A system for providing asynchronous replication, the system comprising:
a memory storage; and
a processing device coupled to the memory storage, wherein the processing device is operative to:
save a copy of an edited working file to an upload file;
determine whether a server file associated with the upload file has been locked;
determine, in response to a determination that the server file has been locked, whether the lock on the server file was lost;
determine, in response to a determination that the lock on the server file was lost, whether the server file has been changed;
when it is determined that the server file on a server computer has not been changed, update the server file on the server computer with contents of the upload file; and
when it is determined that the server file on the server computer has been changed,
perform a three-way merge of the upload file, a base file, and the changed server file on the server computer, and
update the server file on the server computer with results of the three-way merge.

* * * * *